Patented Nov. 29, 1949

2,489,762

UNITED STATES PATENT OFFICE 2,489,762

SULFUR SALT

Joseph A. Dunn, St. Clair, Mich., and Frank G. Miller, Denville, N. J., assignors to General Foods Corporation, New York, N. Y., a corporation of Delaware No Drawing. Application June 15, 1948, Serial No. 33,225

13 Claims. (Cl. 99—2)

This invention relates to the supplementation of the normal animal diet (including humans as well as domestic animals and fowls) by the addition of nutritional sulphur and more particularly to the incorporation of nutritional sulphur in salt and the prevention of loss thereof from the salt before consumption. This application is a continuation-in-part of our prior applications Serial Nos. 704,285 and 704,286 filed October 18, 1946.

A few principal mineral elements make up the greater part of the mineral content of the animal body, including calcium, magnesium, sodium, potassium, phosphorus, sulphur and chlorine. The normal animal diet is fairly well supplied with these principal mineral elements, but varies from place to place and sometimes is locally deficient in sulphur. This element is important from the nutritional standpoint, the sulphur-bearing amino acids cystine and methionine being constituents in protein tissue, hair, wool, etc. Hence supplementation of the normal diet is sometimes needed to satisfy requirements for nutritional sulphur. On the other hand, it may be desirable under special circumstances to increase the daily intake of nutritional sulphur above the normal animal requirements therefor.

The belief is prevalent that mineral sulphur is of value as a medicament, and it may have a pharmacological value in controlling intestinal flora. Thus it has been a common practice to add mineral sulphur to salt blocks used in feeding domestic animals. However, mineral sulphur is insoluble in the digestive tract and hence is not nutritionally available to compensate for sulphur deficiencies in the diet. Nutritional sulphur must be supplied in the form of a compound that is soluble in the digestive tract to make the sulphur available to the animal during digestion. Also the sulphur compound used must of course be edible in the sense that the amounts actually ingested do not cause objectionable toxic effects. The present application is directed particularly to supplementation of the diet with compounds furnishing such nutritional sulphur to the animal, examples of compounds suitable for this purpose being given hereinafter. Reference is made to our copending applications Serial Nos. 33,223, 33,224 and 33,226 filed concurrently herewith for supplementation of the diet with other minerals in a similar manner.

Since there is a substantial supply of nutritional sulphur in the normal diet, the amount of additional sulphur required to build this supply up to an adequate level, or even to provide a substantial excess of nutritional sulphur, is very small and of the same order as the required amounts of the so-called "trace elements" such as iron, copper, manganese, iodine, etc. When such small amounts of trace mineral supplements are simply mixed with the far larger volumes of food normally consumed, it is difficult to obtain uniform administration to individuals. However, salt is a universal constituent of the animal diet which is consumed in small but fairly constant daily rations, and for these reasons is an excellent medium for incorporating trace mineral supplements in the diet. The desired compounds can be simply admixed with the salt in proportions that will provide appropriate amounts of minerals, taking into account the amount of supplement desired and the daily ration of salt consumed. Because the amount of salt consumed is small, the much smaller daily ration of trace mineral supplement may amount in some cases to 2–3% by weight of the salt, although usually it will be less than 1%.

It has been proposed heretofore to add various trace element compounds, especially iodine in the form of potassium iodide, to salt for use on the table or in the kitchen or for feeding animals. In many instances, however, salt to which such trace element compounds have been added is found to be substantially or completely devoid of trace elements after a relatively short period of time. In the case of iodine, this loss has been generally attributed to oxidation resulting in liberation of free iodine, but iodine continues to be lost in spite of the most effective measures that can be devised to prevent oxidation (see for example Hart Patent No. 2,144,150, Shumaker et al. Patent No. 2,164,089, see Patent No. 2,170,611, Russell Patent No. 2,331,424, and Whitmoyer Patent No. 2,382,193). Furthermore, the same loss has been observed in the case of non-volatile and non-oxidizable trace elements such as trace metals.

We have discovered that such losses of trace elements are due in large part, if not entirely, to solution of compounds used in water or salt brine and actual leaching out of the compounds from the salt mass, and nutritional sulphur compounds may be lost in the same way when they are incorporated in salt. Although salt is a very advantageous medium from the above standpoints for incorporating mineral supplements in the diet, it is also very hygroscopic and absorbs large amounts of moisture from the atmosphere. As moisture continues to be absorbed by the salt, water or salt brine gradually percolates through the salt mass and collects at or drips from the bottom of the mass. The supplemental mineral compounds are present only in very small amounts and moreover are admixed in finely divided form with the salt so that they are distributed as small particles on the surfaces of the salt crystals and constitute a sort of external phase which tends to be preferentially dissolved. Under these conditions, the small amounts of such compounds are rapidly dissolved, even though they may be only very sparingly soluble in water or salt brine.

Such percolation of moisture with the effects described above takes place not only in loose salt but even in salt blocks which are placed at suitable points as salt licks for cattle and other animals, as for example in feeding sheds, in the open near feeding or watering places, or often on stakes in the open field. These blocks, usually in 50 lb. sizes, are conventionally made by compressing ordinary salt under pressure of the order of ten tons per square inch, resulting in dense solid masses that are practically vitreous in character and apparently are substantially impervious. However, their density is not equal to the density of solid crystalline salt which is 2.16 whereas the specific gravity of salt blocks is 2.02 plus or minus depending on the pressure used and the crystalline character of the salt. Thus the blocks contain about 7% of void spaces and to this extent are porous or capillary in nature. We have found that moisture deposited and/or absorbed at the surface of such a block gradually diffuses or percolates throughout the block under the influences of capillary action and gravitation.

The percolating moisture first dissolves both salt and supplemental mineral compound from the surface layer of the salt and, as the solution percolates inwardly and downwardly through the salt mass, its concentration of both mineral compound and salt progressively increases until it passes out of the bottom. Percolation takes place under humid conditions regardless of whether the salt is exposed to light and/or rain or not; in other words, the same loss of supplemental minerals occurs during storage of the salt in the dark in a humid warehouse or the like, particularly if the relative humidity of the surrounding atmosphere is above the critical range for salt of 70–75%. The surface layer of the salt is rapidly depleted of supplemental minerals which migrate both toward the center of the mass and toward its bottom. The zone of surface depletion steadily increases in depth and the concentration of supplemental minerals in the interior first rises and then rapidly falls as the minerals are lost by escape of the percolating solution from the bottom of the mass.

Thus complete depletion of a 50 lb. salt block may occur within 30 to 60 days simply by exposing it to a humid atmosphere, and this depletion is quite independent of illumination or exposure to sunlight. More important, however, is the fact that practically complete depletion of the surface layer takes place within a very few days, after which animals licking the block get nothing but salt because the rate of consumption of the block by licking is seldom if ever as great as the rate of increase in depth of the depleted surface zone. It makes no difference how much supplemental mineral is retained in the center of the block if there is none in the surface layer licked by the animal. The same loss of supplemental minerals occurs even more rapidly in the case of loose salt because of the greater porosity of the mass and the relative ease with which moisture may enter and percolate through the mass. In this case the effect of surface depletion can be reduced by stirring or agitating the mass, but this is not feasible during storage and is seldom practiced after the salt has been placed in the feed trough. Even in the ordinary salt shaker or open salt cellar used in the kitchen or on the table, it is a common experience in damp, humid weather to find drops of water or brine or crusted salt adhering to the shaker or cellar, usually at the bottom of the salt mass. Supplemental mineral compounds, originally distributed throughout the salt, become concentrated in such liquid phases and to a large extent remain in the shaker or cellar when salt is removed therefrom.

The chief objects of the present invention are to supplement the normal diet with respect to sulphur by the addition to salt of sulphur compounds which furnish sulphur in nutritionally available forms and to prevent loss of such compounds and maintain them in uniform admixture with the salt regardless of the conditions to which it may be exposed so that the intended supplementation of the diet is secured as the salt is gradually consumed.

We avoid depletion of sulphur due to percolating moisture by the use of sulphur compounds that are substantially insoluble in the moisture taken up by the salt and in the brine solution resulting from percolation of this moisture through the salt. Complete insolubility is not necessary, the limiting condition being that the ratio of the solubility of the compound in water containing 0–26% NaCl to the solubility of salt in water should not be substantially greater than the original ratio of said compound to the salt. As previously indicated, the amount of sulphur compound will usually be less than 1% by weight of the salt, although in special cases 2–3% may be used. The ratio of solubilities must be limited accordingly. If this limiting value is exceeded, the sulphur compound will be dissolved and lost at a greater rate than the salt and depletion will take place, beginning in the surface layer of the salt as stated above. If the limiting value is maintained, however, the proportion of compound to salt, particularly in the surface layer of the salt, will remain unchanged although of course there will be a gradual loss in total weight of the salt mass. At less than the limiting value of the solubility ratio, on the other hand, the proportion of sulphur compound to salt will increase somewhat not only in the mass as a whole but also at its surface.

It will be understood that such insolubility in water containing 0–26% NaCl must be coupled with a substantial degree of solubility in the digestive fluids found in the gastro-intestinal tract in order that the sulphur may become available during digestion.

The relative solubilities of a particular sulphur compound in brine and of salt in water may be ascertained from known data or determined by experiment if such data are not available. In this connection, it is known that the solubility of a substance in a solution is a function of the concentration of other substances in the solution. It is also known that the dispersibility of colloidal material in a solution is a function of the amount of electrolyte present in the solution. These two phenomena are highly important factors in the present invention because the moisture taken up by the salt and percolating through it may vary in salt concentration from zero to saturation (i. e., 0–26%). Some compounds increase in solubility in salt brine as the salt content increases while others decrease in solubility, being more soluble in pure water. Still others exhibit their maximum solubility or dispersibility at intermediate salt concentrations. For the purposes of the present invention, the compounds used should be substantially insoluble and non-dispersible (i. e., non-peptizable in the true colloidal sense) in water containing 0–26% salt.

Instead of ascertaining relative solubilities, a simple method of determining whether the desired conditions will be obtained with any given compound is to analyze the drip from a test sample held in an atmosphere of high humidity. As long as the proportion of sulphur compound to salt in the drip does not exceed substantially the original proportion of said compound to salt in the test sample, the retention of sulphur in the salt is satisfactory.

In using this testing method, we have found it satisfactory to employ the following procedure. Small test blocks (approximately 5 gm. in weight) were formed with a laboratory hydraulic press applying pressures equivalent to those used in the commercial production of salt blocks. A series of these small blocks were suspended over suitable test tubes and exposed to a relative humidity of 90% or higher for 43 hours after which the blocks and the respective samples of drip collected in the test tubes were analyzed for their salt and sulphur content. For convenience the results of these analyses were expressed in terms of the percentage of the original content of sulphur compound remaining in the test block, 100% retention meaning that none of the sulphur was lost in the drip.

Under the above test conditions, the salt loss from a test block will vary from 5% to 10%. Hence retention figures in the range 90–95% reflect equal rates of loss of sulphur and salt. In other words, the proportion of sulphur to salt in the block after the test and also in the drip is the same as in the original block. Retention values above 90–95% indicate loss of salt at a faster rate than sulphur and a consequent increase in concentration of sulphur in the block. On the other hand, retention values of less than 90–95%, particularly those less than 85%, indicate that sulphur is being lost at a sufficiently faster rate than the salt to result in undesirable depletion of sulphur from the salt.

We have correlated results obtained in such rapid retention tests with practical experience when 50 lb. cattle blocks are held in damp warehouses or exposed in the field, and have determined that when retention values of about 85% and higher are obtained with the rapid retention test, the corresponding commercial blocks are effectively stabilized against loss of supplemental mineral compounds. We have also demonstrated that when retention values of 95–100% are obtained with the rapid retention test, the corresponding commercial blocks when stored in damp warehouses or exposed in the field will actually increase in their proportion of supplemental mineral compound because the salt is preferentially dissolved. This increase is particularly evident at the surface of the block where the supplemental mineral is immediately available to the animal at all times.

When the sulphur compound is to be incorporated in loose salt, the foregoing test procedure can be simplified and at the same time brought into closer conformity with practical conditions by suspending a small amount of the loose salt in a bag or on a screen which allows passage of the drip. Preferably the material of the bag or screen should be such that it does not absorb appreciable amounts of the percolating solution, as otherwise retention of the salt and/or sulphur compounds in the material may complicate the analyses.

The useful nutritional sulphur compounds are subject to the three basic requirements mentioned above, namely, they must be edible (i. e., non-toxic), they must be soluble in digestive fluids in order for the sulphur to become available to the animal during digestion, and they must be substantially insoluble in water containing 0–26% salt. Within these limitations, however, various types of sulphur compounds can be used. We prefer to use compounds of either or both of the following two general classes:

(a) Insoluble thio-proteins, derived from biological sources and rich in the sulphur-bearing amino acids cystine and methionine which are absorbed by the animal during digestion. Examples of such thio-proteins are casein, keratin and collagen. Thio-proteins can also be added in the form of crude materials such as poultry feathers, hair, wool and hides, and horns and hoofs after suitable processing such as autoclaving to render the thio-proteins digestible.

(b) Insoluble sulphides which are digested to liberate sulphide sulphur in ionized form. It is known that sulphide sulphur can be utilized by the body in building sulphur-bearing amino acids such as cystine. The liberation of sulphide sulphur is indicated by the characteristic odor of hydrogen sulphide on treatment with hydrochloric acid. Examples of suitable inorganic sulphides are Lazurite, either natural or synthetic; approximate composition $Na_5S_3Al_3Si_3O_{12}$
Manganous sulphide (MnS) or the mineral alabandite
Ferrous sulphide (FeS) or the mineral troilite
Zinc sulphide (ZnS) or the mineral sphalerite Organic sulphides such as thioacids (e. g., thiostearic acid) and their esters (e. g., ethyl thiostearate) are also suitable.

It will be understood that nutritional sulphur compounds satisfying the requirements set forth above can be used either alone or in combination with other suitable nutritional sulphur compounds, the amounts being sufficient to provide the desired dietary supplement of nutritional sulphur. As previously stated, the total amount of these compounds may be as high as about 3% by weight of the salt, although usually smaller amounts will be sufficient. As a typical example, 0.25% lazurite and 1% thio-protein or 0.5% ethyl thiopalmitate may be used together with enough salt to make up 100%.

It will be noted that the nutritional sulphur compound may provide other supplemental minerals such as the trace metals manganese, iron and zinc found in the above examples. On the other hand, the salt may contain additional trace mineral supplements as may be desired, such as trace metal compounds or trace halogen compounds.

In the case of salt blocks, it is often desirable to color the sulphur-supplemented blocks to distinguish them from other blocks. The sulphur compound itself may provide such coloring as in the case of lazurite (ultramarine blue). However, any suitable pigment may be added to the block for this purpose.

In controlling dietary deficiencies by means of mineral supplements, one of the major problems is to secure approximately uniform administration of the supplement to the animal because of the small amount usually supplied, the practical difficulty of distributing such small amounts uniformly through feed mixtures, etc. It will be seen that salt embodying the present invention eliminates such difficulties and provides a very convenient and practical means of administering nutritional sulphur supplements in uniform controlled amounts. The consumption of salt by an animal such as a cow, for example, will be reasonably uniform in amount depending on the daily requirement of the animal and is not materially affected by the presence of a small proportion of supplemental minerals. The present invention makes it possible to disperse such minerals throughout a mass of salt in definite uniform concentration, although present only in fractions of a per cent, and also to maintain such concentration substantially unchanged as the salt is consumed. Hence each daily, approximately constant ration of salt consumed by the animal contains a definite, predetermined amount of supplemental sulphur.

It will be understood that the invention is not restricted to any particular sulphur compound, since suitable compounds of various types are available within the qualifications stated above and selection may be made largely on the bases of availability and cost. The amount of any compound required can be determined from its sulphur content in relation to the amount of sulphur desired as a dietary supplement and to the normal consumption of salt.

Hence reference should be had to the appended claims for a definition of the limits of the invention.

What is claimed is:

1. Salt containing a nutritional sulphur supplement to the animal diet and of the type having dispersed therethrough an edible sulphur compound of the group consisting of thio-proteins and sulphides, said compound being substantially soluble in digestive fluids whereby nutritional sulphur is made available to the animal during digestion but substantially insoluble in water containing 0–26% salt so that it is not dissolved by moisture absorbed by and percolating through the salt.

2. Salt containing a nutritional sulphur supplement to the animal diet and of the type having dispersed therethrough not more than 3% of an edible sulphur compound of the group consisting of thio-proteins and sulphides, said compound being substantially soluble in digestive fluids whereby nutritional sulphur is made available to the animal during digestion but the ratio of the solubility of said compound in water containing 0–26% salt to the solubility of salt in water being maximally substantially equal to the ratio of the proportion of said compound to the proportion of salt.

3. A salt block containing a nutritional sulphur supplement to the animal diet and of the type comprising a dense solid mass of compressed salt having dispersed therethrough an edible sulphur compound of the group consisting of thio-proteins and sulphides, said compound being substantially soluble in digestive fluids whereby nutritional sulphur is made available to the animal during digestion but substantially insoluble in water containing 0–26% salt so that it is not dissolved by moisture absorbed by and percolating through the block.

4. A salt block containing a nutritional sulphur supplement to the animal diet and of the type comprising a dense solid mass of compressed salt having dispersed therethrough not more than 3% of an edible sulphur compound of the group consisting of thio-proteins and sulphides, said compound being substantially soluble in digestive fluids whereby nutritional sulphur is made available to the animal during digestion but the ratio of the solubility of said compound in water containing 0–26% salt to the solubility of salt in water being maximally substantially equal to the ratio of the proportion of said compound to the proportion of salt in the block.

5. Salt having dispersed therethrough not more than 3% of a nutritional sulphur supplement to the animal diet in the form of an edible inorganic sulphide that is substantially soluble in digestive fluids whereby nutritional sulphur is made available to the animal during digestion, the ratio of the solubility of said compound in water containing 0–26% salt to the solubility of salt in water being maximally substantially equal to the ratio of the proportion of said compound to the proportion of salt.

6. Salt having dispersed therethrough not more than 3% of a nutritional sulphur supplement to the animal diet in the form of an edible thio-protein that is substantially soluble in digestive fluids whereby nutritional sulphur is made available to the animal during digestion, the ratio of the solubility of said compound in water containing 0–26% salt to the solubility of salt in water being maximally substantially equal to the ratio of the proportion of said compound to the proportion of salt.

7. Salt having dispersed therethrough not more than 3% of a nutritional sulphur supplement to the animal diet in the form of an edible organic sulphide that is substantially soluble in digestive fluids whereby nutritional sulphur is made available to the animal during digestion, the ratio of the solubility of said compound in water containing 0–26% salt to the solubility of salt in water being maximally substantially equal to the ratio of the proportion of said compound to the proportion of salt.

8. A salt block containing a nutritional sulphur supplement to the animal diet and of the type comprising a dense solid mass of compressed salt having dispersed therethrough an edible inorganic sulphide that is substantially soluble in digestive fluids whereby nutritional sulphur is made available to the animal during digestion but is substantially insoluble in water containing 0–26% salt so that it is not dissolved by moisture absorbed by and percolating through the block.

9. A salt block containing a nutritional sulphur supplement to the animal diet and of the type comprising a dense solid mass of compressed salt having dispersed therethrough an edible thio-protein that is substantially soluble in digestive fluids whereby nutritional sulphur is made available to the animal during digestion but is substantially insoluble in water containing 0–26% salt so that it is not dissolved by moisture absorbed by and percolating through the block.

10. A salt block containing a nutritional sulphur supplement to the animal diet and of the type comprising a dense solid mass of compressed salt having dispersed therethrough an edible organic sulphide that is substantially soluble in digestive fluids whereby nutritional sulphur is made available to the animal during digestion but is substantially insoluble in water containing 0-26% salt so that it is not dissolved by moisture absorbed by and percolating through the block.

11. A salt block having not more than 3% lazurite dispersed therethrough.

12. A salt block having not more than 3% thioprotein dispersed therethrough.

13. A salt block having not more than 3% ethyl thiopalmitate dispersed therethrough.

JOSEPH A. DUNN.
FRANK G. MILLER.

REFERENCES CITED

The following references are of record in the file of this patent:

UNITED STATES PATENTS

| Number | Name | Date |
|---|---|---|
| 672,672 | Green | Apr. 23, 1901 |
| 2,382,193 | Whitmoyer et al. | Aug. 14, 1945 |